(12) United States Patent
Nakanishi et al.

(10) Patent No.: US 10,507,784 B2
(45) Date of Patent: Dec. 17, 2019

(54) AIRBAG

(71) Applicant: TOYODA GOSEI CO., LTD., Kiyosu-shi, Aichi-ken (JP)

(72) Inventors: Hiroyuki Nakanishi, Kiyosu (JP); Naohiko Ishiguro, Kiyosu (JP); Ryotaro Ishida, Kiyosu (JP); Wataru Miura, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 94 days.

(21) Appl. No.: 15/879,489

(22) Filed: Jan. 25, 2018

(65) Prior Publication Data

US 2018/0215339 A1 Aug. 2, 2018

(30) Foreign Application Priority Data

Feb. 2, 2017 (JP) .................. 2017-017991

(51) Int. Cl.
*B60R 21/233* (2006.01)
*B60R 21/203* (2006.01)
*B60R 21/239* (2006.01)

(52) U.S. Cl.
CPC .......... *B60R 21/233* (2013.01); *B60R 21/203* (2013.01); *B60R 21/239* (2013.01); *B60R 2021/23316* (2013.01); *B60R 2021/23324* (2013.01)

(58) Field of Classification Search
CPC ... B60R 21/233; B60R 21/239; B60R 21/203; B60R 2021/23324; B60R 2021/23316; B62D 1/04
See application file for complete search history.

(56) References Cited

U.S. PATENT DOCUMENTS

| | | | | |
|---|---|---|---|---|
| 5,249,824 A | * | 10/1993 | Swann | B60R 21/233 280/729 |
| 6,086,092 A | * | 7/2000 | Hill | B60R 21/233 280/729 |
| 6,419,267 B1 | * | 7/2002 | Hashimoto | B60R 21/233 280/729 |
| 6,648,366 B2 | * | 11/2003 | Dillon | B60R 21/233 280/729 |

(Continued)

FOREIGN PATENT DOCUMENTS

JP 11-245759 A 9/1999

*Primary Examiner* — Darlene P Condra
(74) *Attorney, Agent, or Firm* — Posz Law Group, PLC

(57) ABSTRACT

An airbag includes: an outer member configured to form an outer peripheral wall upon completing inflation, which includes a driver side portion configured to receive a driver, and a steering-wheel side portion supported by a steering wheel; and an inner member provided to expand inside the outer member. The inner member has a supply port for supplying inflation gas to the outer member and covers the inflow opening of the outer member to be arranged on an upstream side of flow of the inflation gas flowing from the inflow opening into the airbag such that a higher pressure can be maintained in the inner member than the outer member. The inner member includes a front support inflating portion configured to support a portion of the driver side portion of the outer member at least at a front side upon completing inflation of the airbag.

2 Claims, 17 Drawing Sheets

(56) References Cited

U.S. PATENT DOCUMENTS

2004/0135352 A1* 7/2004 Igawa .................. B60R 21/233
                                                    280/729
2007/0278774 A1   12/2007 Ishiguro et al.
2014/0375032 A1* 12/2014 Fukawatase .......... B60R 21/239
                                                    280/729

* cited by examiner

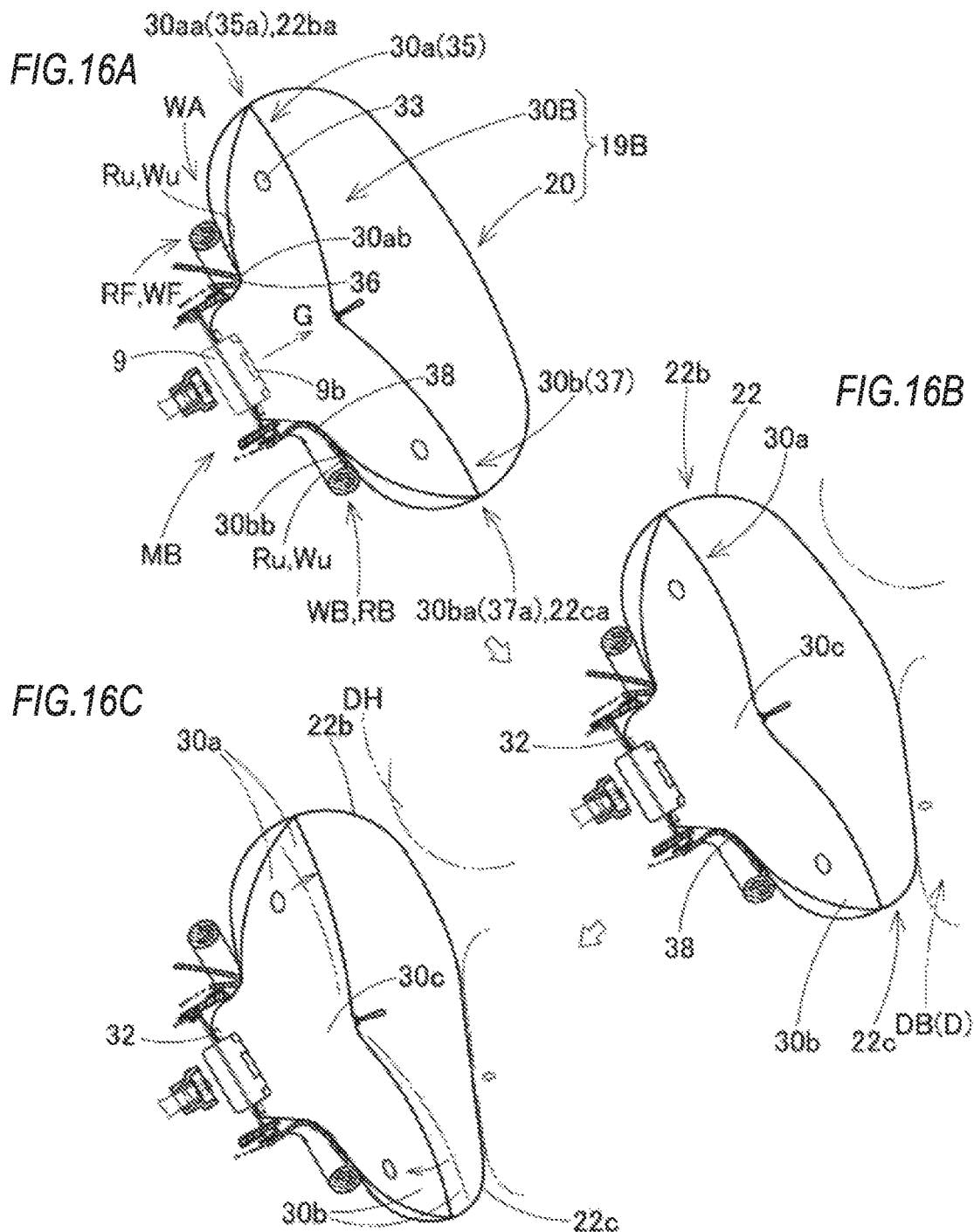

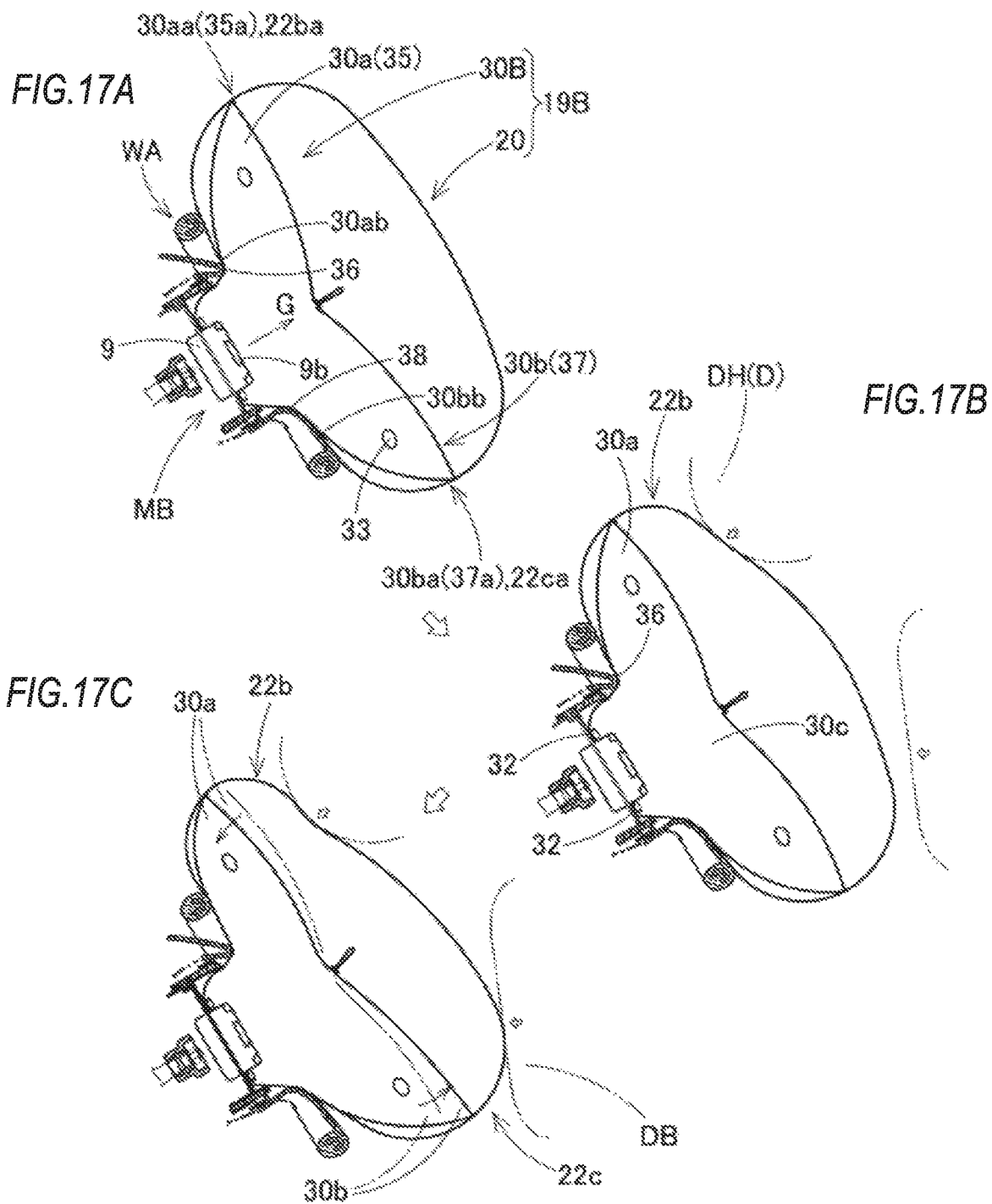

AIRBAG

CROSS-REFERENCE TO RELATED APPLICATION(S)

This application is based upon and claims the benefit of priority from Japanese Patent Application No. 2017-017991, filed on Feb. 2, 2017, the entire contents of which are incorporated herein by reference.

BACKGROUND

1. Field of the Invention

The present invention relates to an airbag used for a driver airbag apparatus to be mounted in a steering wheel of a vehicle, and particularly, to an airbag which is used for an irregular-shaped steering wheel having a shape in which at least a length from a center portion to a front side among the front side and a rear side is shorter than a length from the center portion to left and right sides.

2. Description of the Related Art

There has been known a driver airbag apparatus to be mounted in a non-circular steering wheel which does not have a front portion of a ring portion grasped during steering, that is, a steering wheel with a shape in which a length from a center portion toward a front side is shorter than a length to both left and right sides. An airbag in the apparatus includes an outer bag, that is, a bag which bridges the front side of a truncated ring is provided on a lower surface of the front side of an inner bag which receives the driver (See, for example, JP-A-H11-245759 (FIG. 7)).

However, in this airbag, the outer bag requires a length in the left-right direction which exceeds a length of the truncated ring portion, and if an empty space at the front of the steering wheel (the truncated portion) is large, the outer bag is not supported by the steering wheel and the front side of the airbag (inner bag) folds over and sinks, so that the driver cannot be received in a stable manner.

SUMMARY

The present invention has been made in view of the above circumstances and provides an airbag which can receive a driver in a stable manner and protect the driver upon completing inflation even when mounted in a steering wheel whose length from a center portion to a front side is shortened.

According to an aspect of the present invention, there is provided an airbag which is configured to be accommodated and retained in a center portion of a steering wheel of a vehicle and includes an outer peripheral wall, upon completing inflation of the airbag, the outer peripheral wall including a driver side portion configured to receive a driver, and a steering-wheel side portion supported by the steering wheel and having an outer peripheral edge connected to an outer peripheral edge of the driver side portion, wherein an inflow opening is provided in a vicinity of a center of the steering-wheel side portion and configured to allow inflation gas to flow, and a mounting portion is provided on a peripheral edge of the inflow opening and configured to be fixed to the center portion of the steering wheel. The airbag includes an outer member configured to form the outer peripheral wall upon completing inflation, and an inner member provided so as to expand inside the outer member.

The inner member and the outer member include the inflow opening and the mounting portion. The inner member has a supply port for supplying inflation gas to the outer member and covers the inflow opening of the outer member so as to be arranged on an upstream side of flow of the inflation gas which is flowing from the inflow opening into the airbag such that a higher pressure can be maintained in the inner member than the outer member when the outer member receives a driver. The inner member includes a front support inflating portion configured to support a portion of the driver side portion of the outer member at least at a front side in a front-rear direction upon completing inflation of the airbag.

BRIEF DESCRIPTION OF THE DRAWINGS

The present invention will become more fully understood from the detailed description given hereinbelow and the accompanying drawing which is given by way of illustration only, and thus is not limitative of the present invention and wherein:

FIGS. 16A to 16C are schematic longitudinal cross-sectional views when a driver is being received during operation of the driver airbag apparatus of the third embodiment; and FIGS. 17A to 17C are schematic longitudinal cross-sectional views showing another state in which a driver is being received during operation of the driver airbag apparatus of the third embodiment.

DETAILED DESCRIPTION OF THE INVENTION

Figure 1:
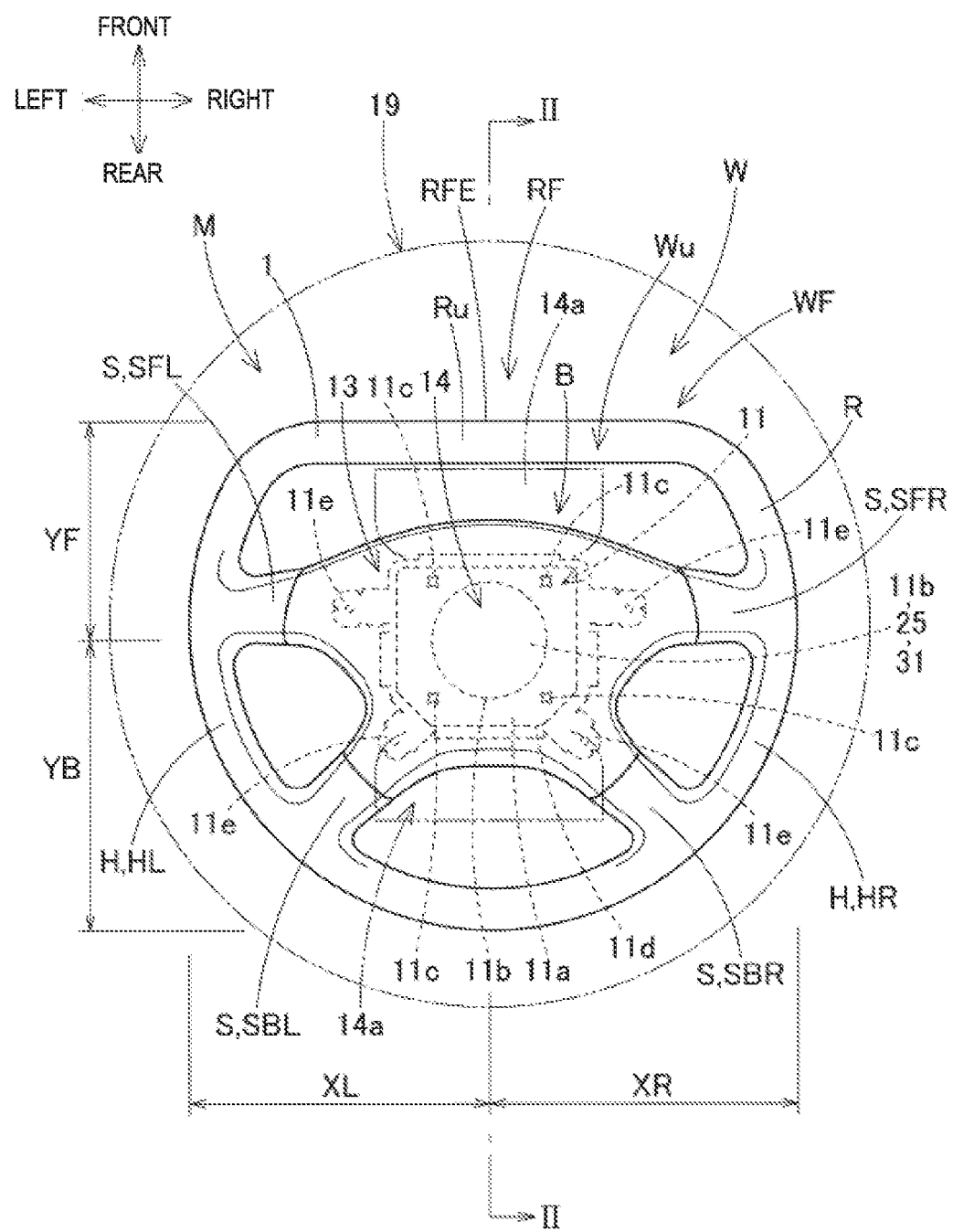
FIG. 1 is a schematic plan view showing a driver airbag apparatus during normal operation which includes a driver airbag according to a first embodiment of the present invention.
Figure 2:
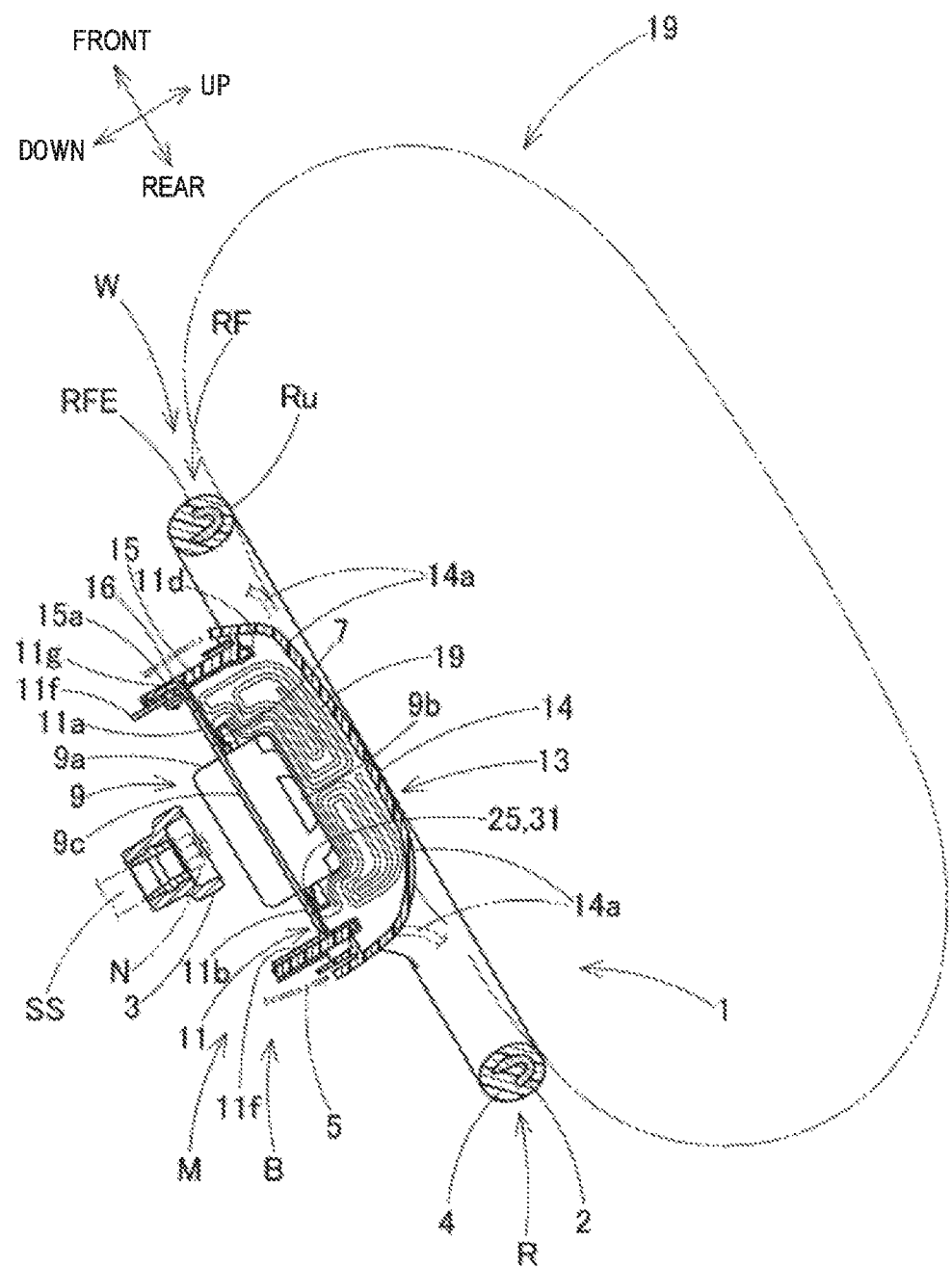
FIG. 2 is a schematic longitudinal cross-sectional view of the driver airbag apparatus of the first embodiment on II-II line in FIG. 1.
Figure 3:
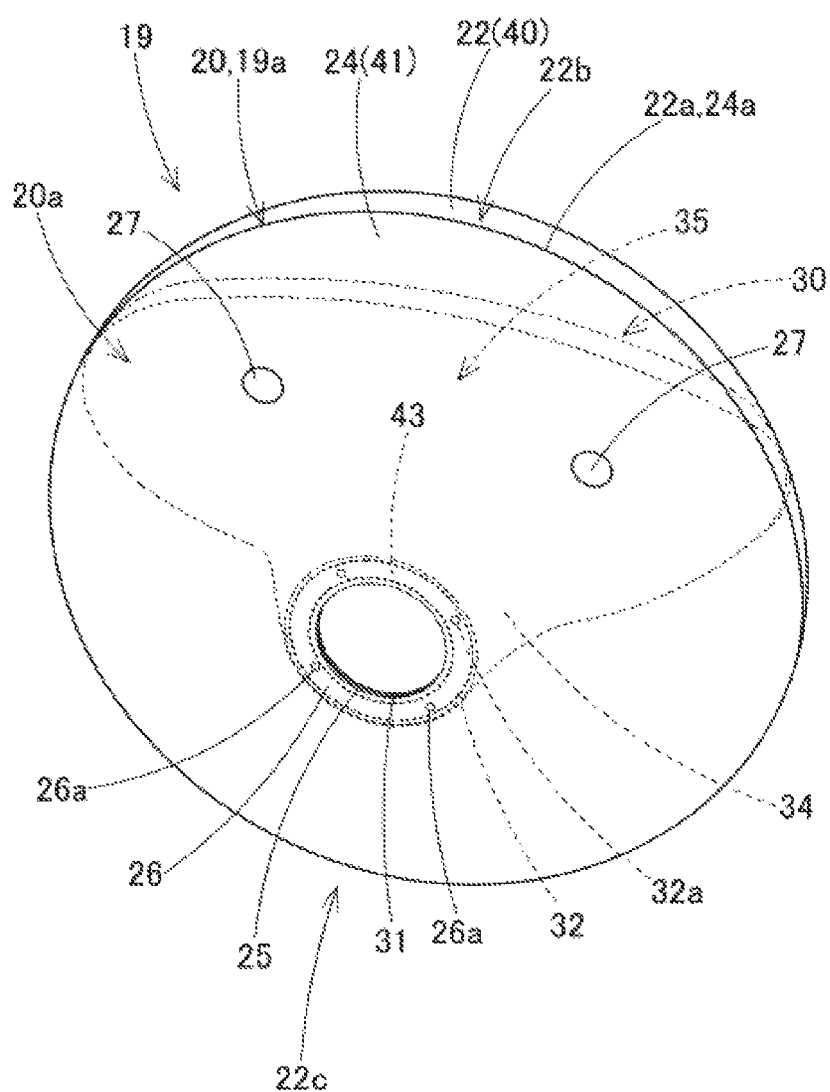
FIG. 3 is a schematic perspective view of the airbag of the first embodiment when inflated.

Hereinafter, embodiments of the present invention will be described with reference to the drawings. As shown in FIGS. 1 and 2, an airbag 19 of the first embodiment is a driver airbag 19, and an airbag apparatus M including the airbag 19 is a driver airbag apparatus M mounted in a steering wheel W. The steering wheel W includes a steering wheel main body 1 and the airbag apparatus M provided in a center portion B of the steering wheel main body 1.

The steering wheel W is an irregular-shaped steering wheel which has operation gripping portions H (L, R) on both left and right sides, and a length from the center portion B toward a front side YF is shortened compared to a length from the center portion B to left and right sides XL, XR. In other words, a front side RF of a substantially circular-shaped ring portion R is indented in a rearward direction and extends along the left-right direction.

The center portion B and the ring portion R are connected by four spokes S (SFL, SFR, SBL, SBR). A boss 3 connected to a steering shaft SS serving as a rotation center during operation is provided below the center portion B. The steering wheel main body 1 includes the center portion B, the spokes S and a core 2 made of metal, such as steel in order to ensure the rigidity of the ring portion R. The boss 3 is provided below a center of the core 2. In addition, a coating layer 4 made of synthetic resin is appropriately provided to cover an outer circumference of the core 2. A lower-surface side of the center portion B is covered with a lower cover 5 made of synthetic resin.

In the description of the present invention, unless otherwise noted, an upper-lower direction corresponds to an axial direction of the steering shaft SS, and a front-rear direction corresponds to a front-rear direction perpendicular to the axial direction of the steering shaft SS at the time of straight steering of the vehicle, and a left-right direction corresponds to a left-right direction perpendicular to the axial direction of the steering shaft SS at the time of straight steering of the vehicle.

As shown in FIGS. 1 and 2, the driver airbag apparatus M includes an airbag 19 which is folded to be accommodated, an inflator 9 which supplies inflation gas to the airbag 19, an airbag cover 13 which covers an upper portion of the folded airbag 19, a case 11 which accommodates and retains the airbag 19 and inflator 9 and retains the airbag cover 13, and a retainer 7 which attaches the inflator 9 along with the airbag 19 to the case 11.

The retainer 7 is a rectangular-shaped ring made of sheet metal and presses peripheral edges of inflow openings 25, 31 of the airbag 19 to attach the airbag 19 to the case 11 and attaches the inflator 9 to the case 11 by fastening it at the four corners nuts and bolts (not shown).

The inflator 9 includes a cylindrical main body 9a having a plurality of gas outlets 9b in an upper portion and a flange portion 9c protruding from an outer peripheral surface of the main body 9a. Through holes (not shown) are formed in the flange portion 9c so as to pass through the respective bolts (not shown) of the retainer 7.

The case 11 is made of sheet metal having a substantially rectangular shape and is provided on an upper side of the center portion B of the steering wheel W to constitute a storage compartment for storing the folded airbag 19. The case 11 includes a substantially rectangular bottom wall 11a and a quadrangular cylindrical side wall 11d extending upward from an outer peripheral edge of the bottom wall 11a. The bottom wall 11a has an insertion hole 11b with a circular shape through which the main body 9a of the inflator 9 can be inserted from below and four through holes 11c (see FIG. 1) through which the bolts (not shown) of the retainer 7 pass. A tongue piece 11f extending downward is formed on the side opposite to the side wall 11d, and a plurality of through holes 11g are provided in the tongue piece 11f for passing rivets 16 to fasten a side wall 15 of the airbag cover 13 to the side wall 11d. Also, in order to fix the airbag apparatus M to the upper portion of the center portion B of the case 11, bracket portions 11e are provided on an upper edge of the side wall 11d of the case 11. The bracket portions 11 are connected to the core 2 by fastening bolts or the like.

The airbag cover 13 is made of synthetic resin and includes a roof wall 14 covering an upper side of the accommodated airbag 19 and a side wall 15 having a substantially square tubular shape extending downward from the vicinity of the outer peripheral edge of the roof wall 14. The roof wall 14 is formed with two doors 14a which are opened forward and rearward by being pressed by the inflating airbag 19. The side wall 15 is formed with through holes 15a through which the rivets 16 are inserted.

The airbag 19 is formed of a material for a bag made of a fabric woven from a weave yarn such as polyamide or polyester. As shown in FIGS. 3 to 6, the airbag 19 is configured such that its shape upon completing inflation is circular when viewed from above and has a substantially elliptical spherical shape when viewed from the side. The airbag 19 includes an outer member 20 configuring an outer peripheral wall 19a when inflation is completed and an inner member 30 which is provided to expand inside the outer member 20.

Figure 4:
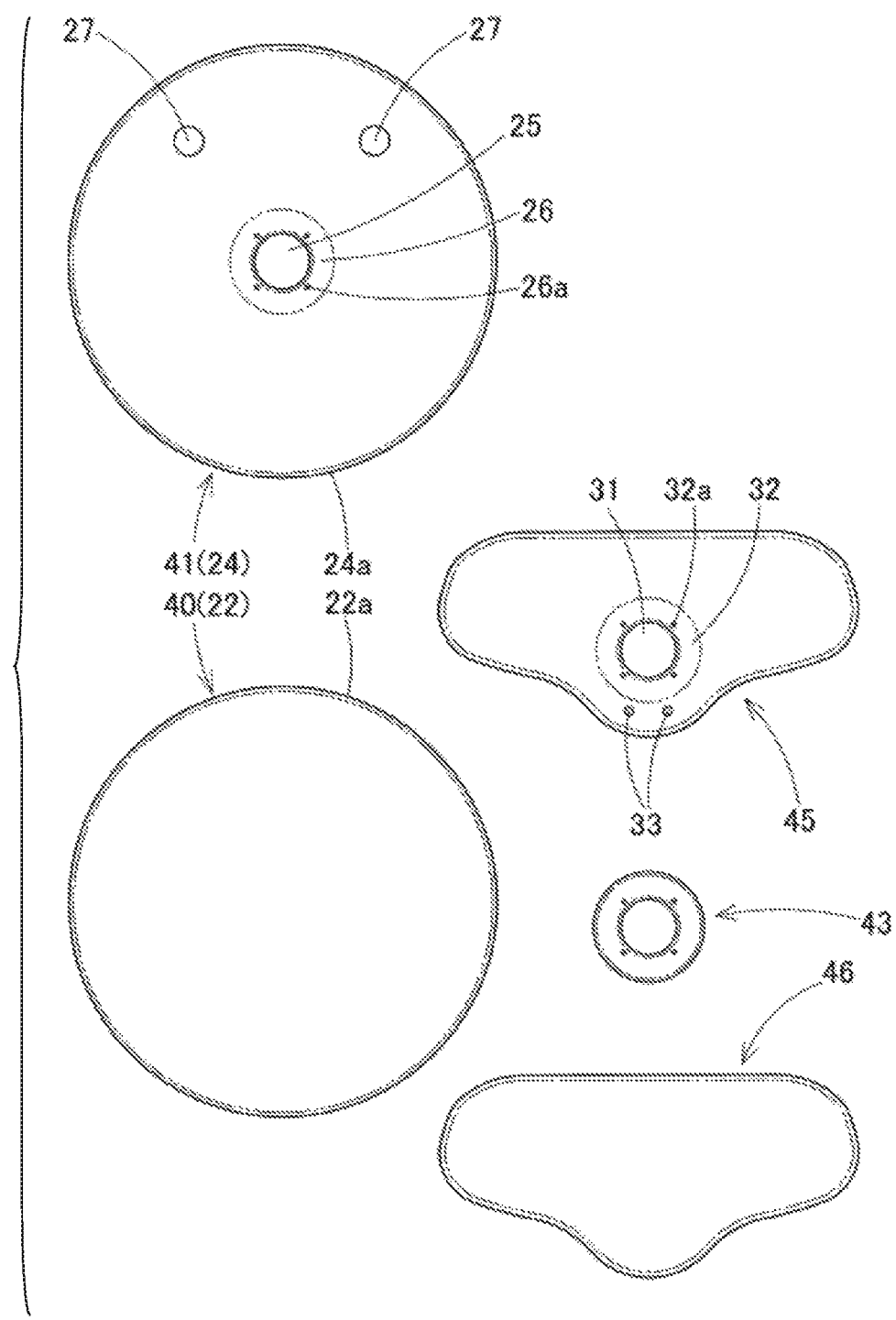
FIG. 4 is a plan view showing fabric materials constituting the airbag of the first embodiment.

The outer member 20 includes a driver side portion 22 configured to receive the driver D (see FIG. 6) by a peripheral wall (outer peripheral wall) 20a upon completing inflation and a steering-wheel side portion 24 supported by the steering wheel W (steering wheel main body 1) and having an outer peripheral edge 24a which is connected to an outer peripheral edge 22a of the driver side portion 22. A center of the steering-wheel side portion 24 is provided with a circular opening 25 for allowing inflation gas G to flow into the airbag 19. That is, the inflow opening 25 is for inserting the main body portion 9a of the inflator 9 from below, and a peripheral edge of the inflow opening 25 is provided with a mounting portion 26 having mounting holes 26a for inserting bolts (not shown) of the retainer 7. The mounting portion 26 is attached to the peripheral edge of the insertion hole 11b of the bottom wall 11a of the case 11 by the retainer 7 together with a mounting portion 32 of the inner member 30 to be described later. The steering-wheel side portion 24 is provided with vent holes 27 for venting excess inflation gas. As shown in FIG. 4, the driver side portion 22 and the steering-wheel side portion 24 are respectively constituted by a driver side base fabric 40 and a steering-wheel side base fabric 41 which are substantially disk-shaped with equal outside diameter dimensions, and the outer peripheral edges of the driver side base fabric 40 and the steering-wheel side base fabric 41 are sewn together to form the outer member 20.

The inner member 30 is fastened together with the outer member 20 by utilizing the retainer 7 so as to be attached and fixed to the bottom wall 11a of the case 11. Therefore, similar to the outer member 20, the inner member 30 has an inflow opening 31 for inserting the main body portion 9a of the inflator 9 from below and the mounting portion 32 having mounting holes 32a through which bolts (not shown) of the retainer 7 at the periphery of the inflow opening 31 are inserted.

The mounting portions 26, 32 including the inflow openings 25, 31 of the outer member 20 and the inner member 30 may be configured as a single sheet.

In this embodiment, a reinforcing fabric 43 is provided at the mounting portion 32 at the periphery of the inflow opening 31 on the inner peripheral side of the inner member 30 in order to increase heat resistance.

Further, the inner member 30 has supply ports 33 with a small-diameter opening capable of supplying inflation gas G to the outer member 20 and covers the inflow opening 25 of the outer member 20 such that the inner member 30 is arranged to be on the upstream side of the flow of inflation gas G from the inflow opening 25 into the airbag 19 so as to maintain a higher pressure than the outer member 20 when receiving the driver D.

Incidentally, in general, in the driver airbag apparatus M, the inflator 9 continues to discharge inflation gas G from the start of operation for a short period of time after receiving the driver D. Therefore, as long as inflation gas G can be smoothly supplied to the outer member 20 side and the opening of the supply ports 33 is not too large, the inner member 30 can maintain a higher pressure than the outer member 20 and shape retention can be ensured without hindering the cushioning action. With vent holes 27 in the outer member 20 for venting excess inflation gas, the outer member 20 can be lower in pressure than the inner member 30, that is, it is easy to maintain a condition in which the inner member 30 is at a higher pressure than the outer member 20.

Further, the inner member 30 includes a front support inflating portion 35 capable of supporting at least the front side in the front-rear direction upon completing inflation of the airbag 19, that is, the front portion 22b side of the driver side portion 22 of the outer member 20. The inner member 30 includes a substantially cylindrical base portion 34 extending upward from the mounting portion 32 in the vicinity of the inflow opening 31 and the front support inflating portion 35 expanding in a fan shape forward from the base portion 34.

In addition, in the present embodiment, the inner member 30 includes a contact support portion 36 which is to be in contact with and supported by a part of the steering wheel W side on the lower surface side from the front of the mounting portion 32 to the front support inflating portion 35 at the time of completing inflation via the outer member 20. In the present embodiment, the contact support portion 36 is in contact with and supported by an upper surface RU on a front edge RFE side of the ring portion R via the steering-wheel side portion 24 of the outer member 20.

As shown in FIG. 4, the inner member 30 is formed by sewing together outer peripheral edges of an opening-side base fabric 45 which is provided with the inflow opening 31 and the mounting portion 32, and a supporting-side base fabric 46 which supports the driver side portion 22 of the outer member 20 from the inner peripheral surface side. The supply ports 33 are disposed in the area of the opening-side base fabric 45 in the base portion 34.

The airbag 19 of the first embodiment is manufactured in the following manner. First, the opening-side base fabric 45 of the inner member 30 is overlapped with the steering-wheel side base fabric 41 of the outer member 20 without providing the inflow openings 25, 31 and the mounting holes 26a, 32a, and further overlapped with the reinforcing fabric 43 and sewn together with the peripheral edges of the mounting portions 26, 32 as a stack of three layers. Then, the inflow openings 25, 31 and the mounting holes 26a, 32a are formed by boring. Then, the outer peripheral edges of the opening-side base fabric 45 of the inner member 30 and the supporting-side base fabric 46 are sewn together. Then, the outer peripheral edges of the steering-wheel side base fabric 41 of the outer member 20 and the driver side base fabric 40 are sewn together by turning them inside-out using the inflow opening 25.

When the airbag apparatus M is assembled and mounted in a vehicle, in a state where the inner member 30 is provided inside the outer member 20, inner bolts (not shown) of the retainer 7 are put in the inner member 30 such that they protrude from the mounting holes 32a, 26a, and then the airbag 19, that is, the outer member 20 together with the inner member 30 are folded, and thereafter, the airbag 19 is wrapped with a prescribed folding-collapse prevention material so as to prevent a folding collapse. Next, the airbag 19 is accommodated on the bottom wall 11a of the case 11 such that each bolt (not shown) of the retainer 7 protrudes from the through holes 11c. Furthermore, the main body 9a of the inflator 9 is inserted in the insertion hole 11b of the bottom wall 11a from below, each bolt (not shown) of the retainer 7 is passed through the flange portion 9c, and nuts (not shown) are fastened to the respective bolts. Accordingly, the case 11 serving as a storage compartment accommodates the airbag 19 and the inflator 9, and the airbag 19 and the inflator 9 can be mounted by utilizing the retainer 7. Thereafter, the airbag apparatus M can be assembled by covering the case 11 with the airbag cover 13, connecting the side walls 11d, 15 to each other using the rivets 16, and attaching the airbag cover 13 to the case 11. The mounting of the airbag apparatus M in the vehicle is performed by fastening the bracket portions 11e of the case 11 to the core 2 of the steering wheel main body 1 which is fastened to the steering shaft SS in advance, with bolts using operation holes (not shown) of the lower cover 5.

Figure 5:
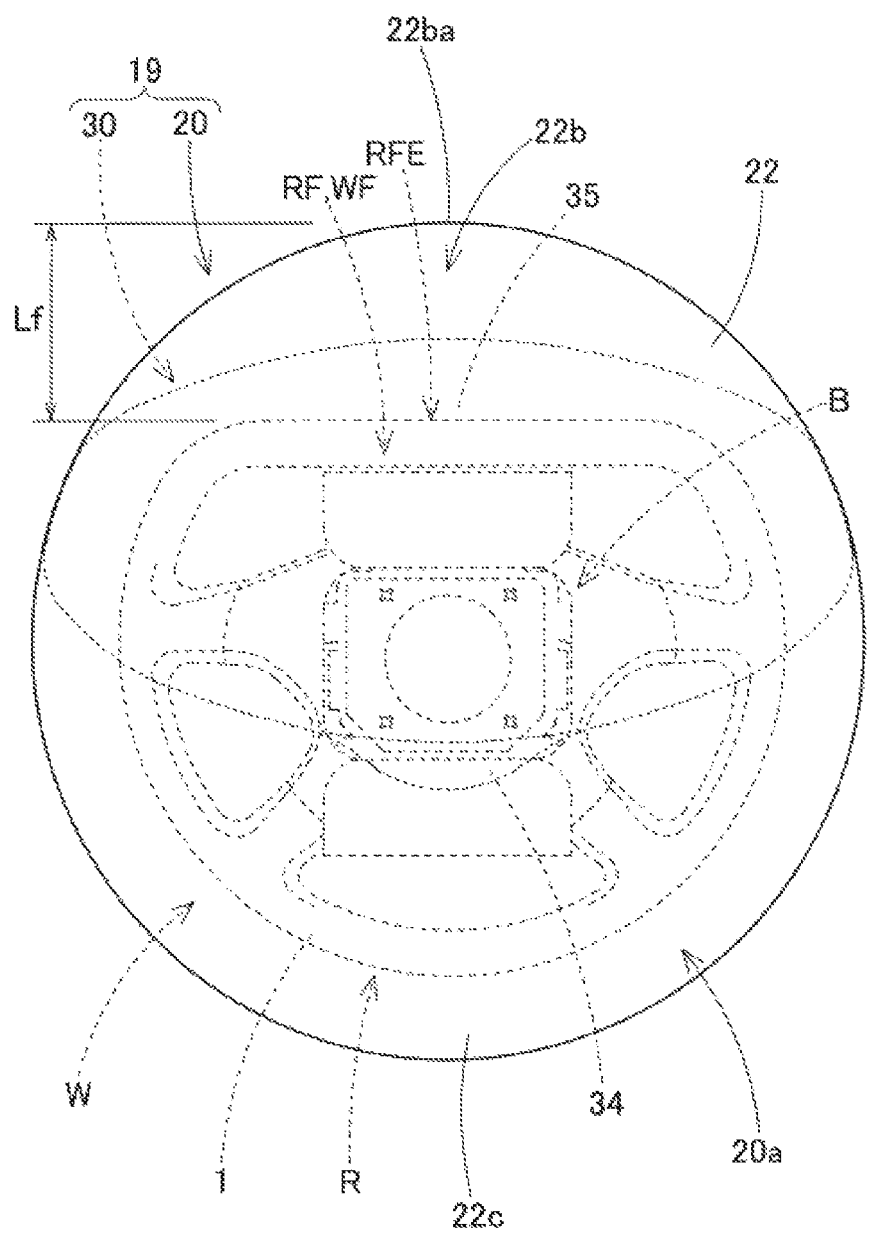
FIG. 5 is a schematic plan view when an operation of the driver airbag apparatus of the first embodiment is completed.

In the driver airbag apparatus M of the first embodiment, when the inflation gas G is discharged from the gas outlets 9b of the inflator 9 during operation, the inner member 30 expands and the inflation gas G flows from the supply port 33 of the inner member 30 and expands the outer member 20, pushing open the doors 14a of the airbag cover 13 and the airbag 19, indicated with a two-dot dashed line in FIGS. 1 and 2, or as shown in FIGS. 5 and 6, protrudes from the case 11 which serves as a storage compartment and covers an upper surface Wu of the steering wheel W, thereby, completing the inflation process.

Figure 6A:
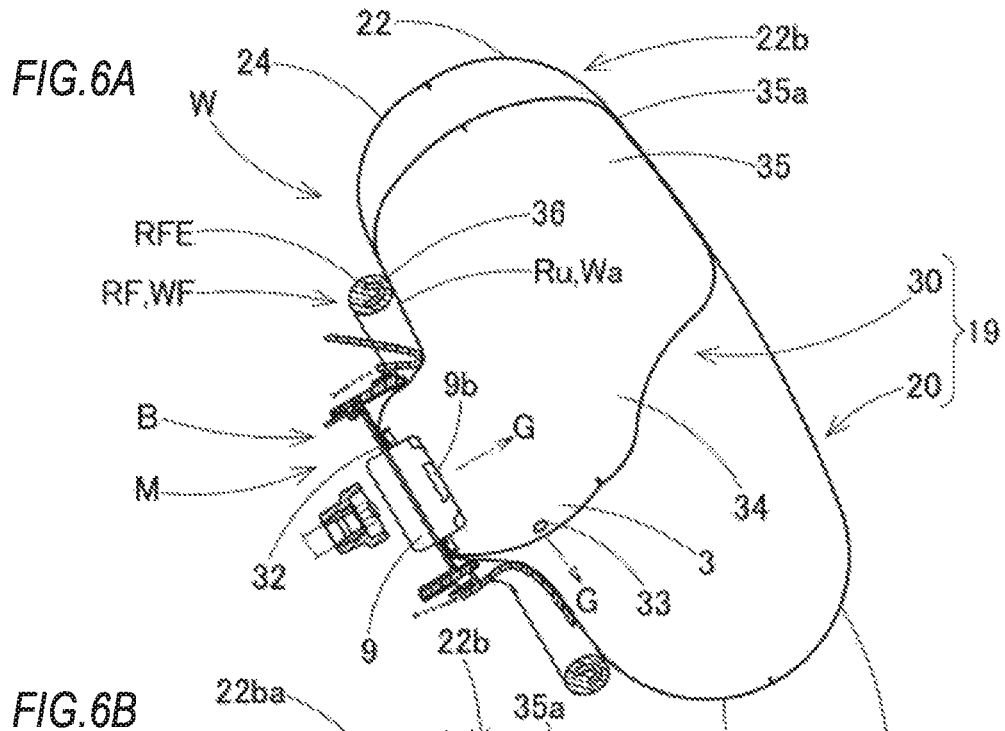
FIGS. 6A and 6B are schematic longitudinal cross-sectional views when a driver is being received during operation of the driver airbag apparatus of the first embodiment.
Figure 6B:
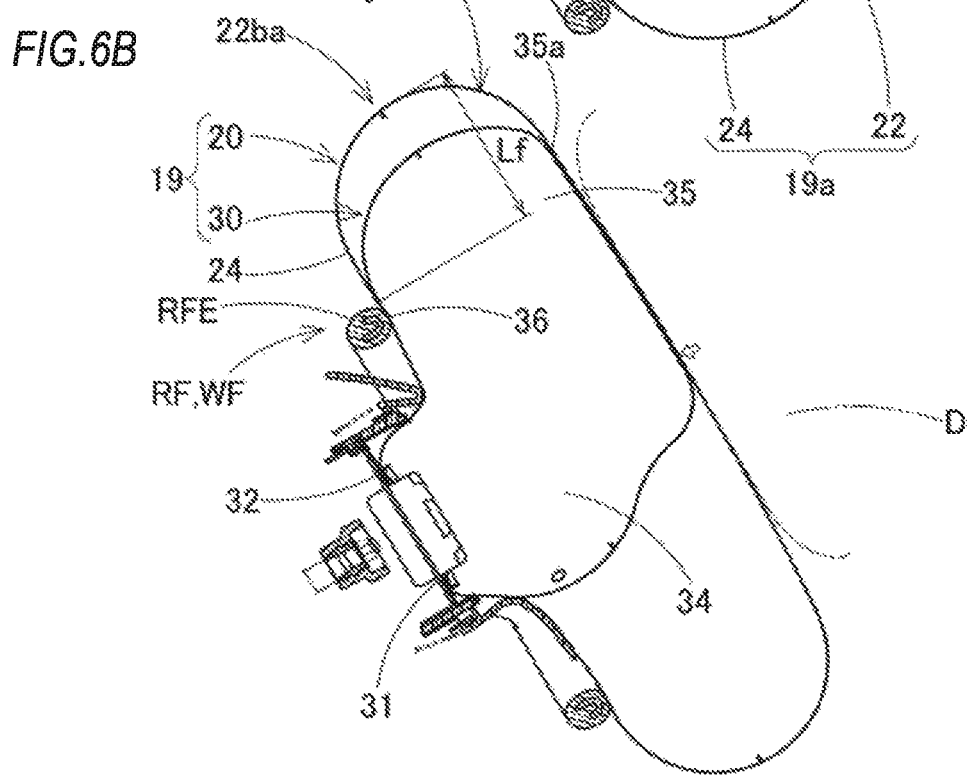

As shown in FIGS. 6A and 6B, the inner member 30 is provided so as to maintain a higher pressure than the outer member 20 when the driver D is received by the outer member 20. Therefore, the inner member 30, with the inflated portion from the base portion 34 where the inflow opening 31 is provided to the front support inflating portion 35, is able to maintain cushioning and ensure a high shape-retaining property, and as a result, the front edge 20ba of the outer member 20 of the airbag 19 increases the forward projection amount Lf (see FIG. 5 and FIG. 6B) from the ring front edge RFE of the ring portion R. Therefore, even if the outer member 20 of the airbag 19 is not directly supported by the front portion WF of the steering wheel W, the front support inflating portion 35 can prevent the front portion 22b of the outer member 20 from sinking, and it is possible to safely receive and protect the driver D approaching the steering wheel W with the entire airbag 19 including the outer member 20.

Therefore, in the airbag 19 of the first embodiment, even if the airbag 19 is mounted in the steering wheel W with a length YF from the center portion B to the front WF being shortened, the driver D can be safely received and protected.

The support state of the front support inflating portion 35 will be described in detail. That is, the contact support portion 35a on the front edge side of the front support inflating portion 35 abuts and supports the lower surface side of the front portion 22b of the driver side portion 22, and the front portion 22b of the outer member 20 is prevented from sinking.

Further, in the present embodiment, the contact support portion 36 which is in contact with and supported by a portion of the steering wheel W side, which in the present embodiment is the upper surface RU of the front edge RFE of the ring portion R, is arranged on the lower side of the inner member 30 in a range from the front side of the mounting portion 32 to the front support inflating portion 35 via the steering-wheel side portion 24 of the outer member 20.

Therefore, in the first embodiment, since the front support inflating portion 35 of the inner member 30 is supported on the steering wheel W side at two points i.e. the mounting portion 32 and the contact support portion 36, the shape-retaining property of the inner member, that is, the amount of pressure, can be reduced, in other words, since the cushioning action can be further enhanced to support the front portion 22b side of the outer member 20, the airbag 19 can receive and protect the driver D more gently.

Of course, the front portion 22b side of the outer member 20 may be supported by the shape-retaining property of the inner member 30 itself without providing the support portion 36 supported by the steering wheel W side.

In this case, although it is desirable that the contact support portion 35a supporting the lower surface side of the driver side portion 22 of the outer member 20 on the upper surface side of the front support inflating portion 35 is provided on the front side of the front edge RFE of the steering wheel W, the contact support portion 35a may be provided on the rear side of the front edge RFE of the steering wheel W as long as it prevents the sinking of the front portion 22b side of the outer member 20.

Figure 7:
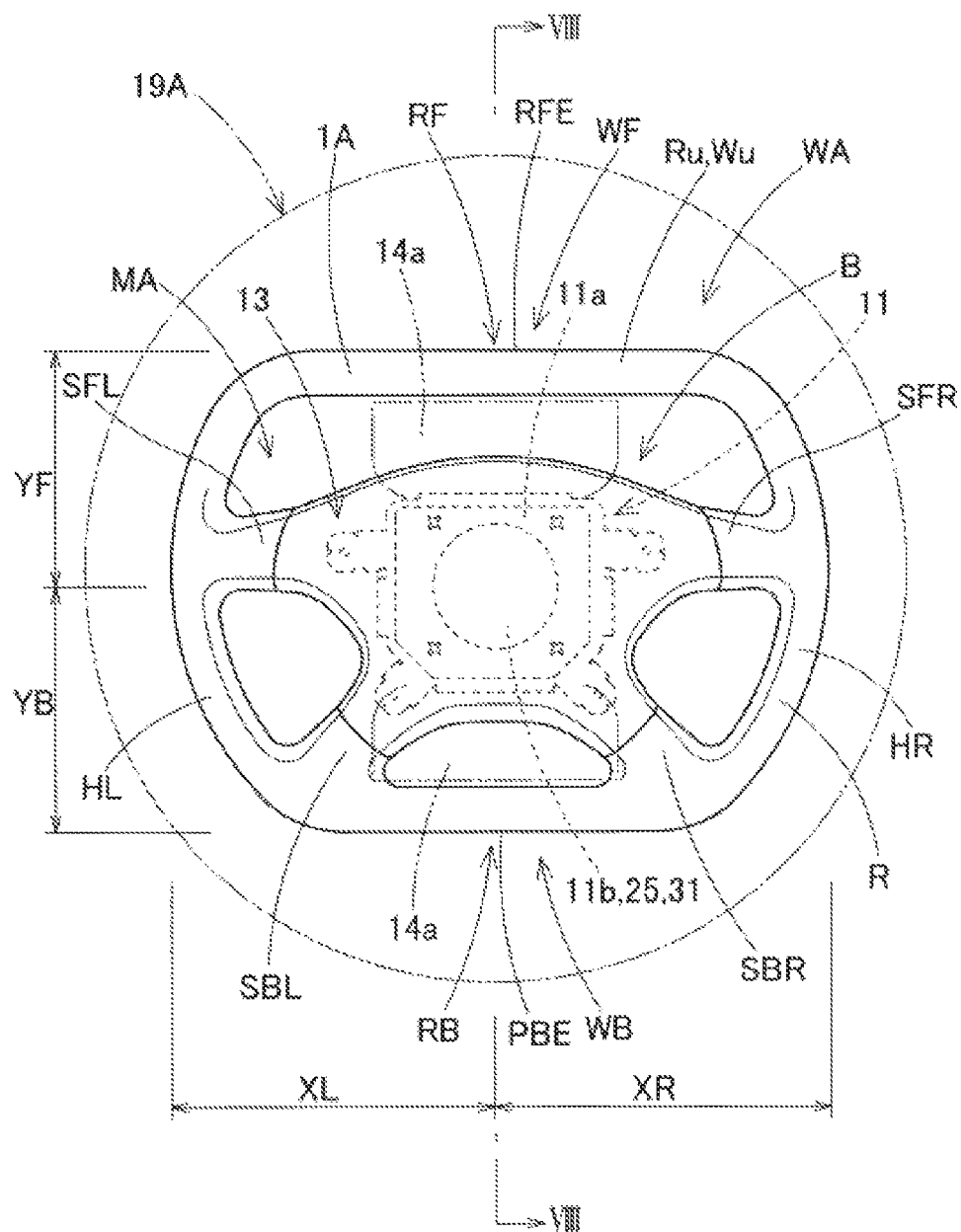
FIG. 7 is a schematic plan view showing a driver airbag apparatus during normal operation which includes an airbag according to a second embodiment of the present invention.
Figure 8:
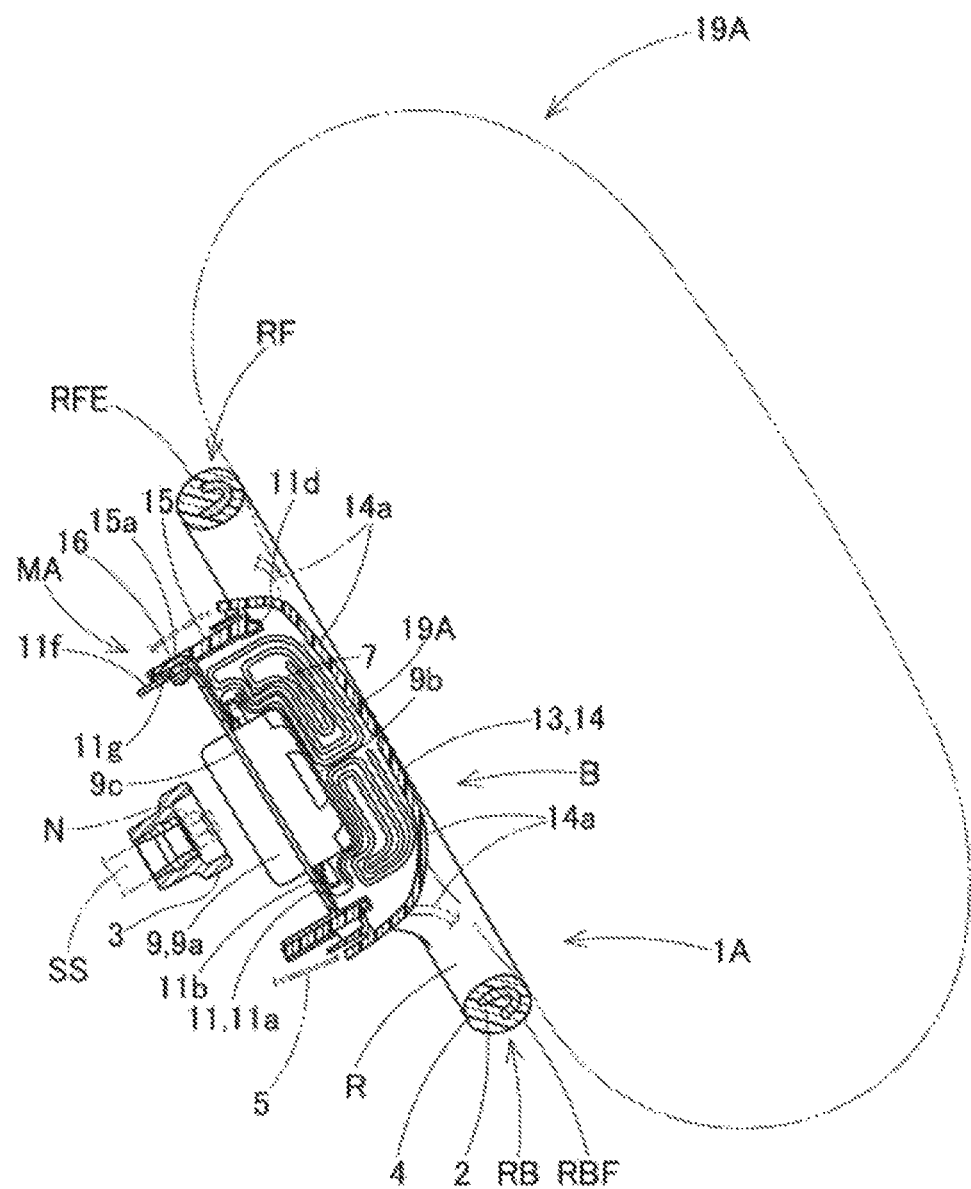
FIG. 8 is a schematic longitudinal cross-sectional view of the driver airbag apparatus of the second embodiment on VIII-VIII line in FIG. 7.
Figure 9:
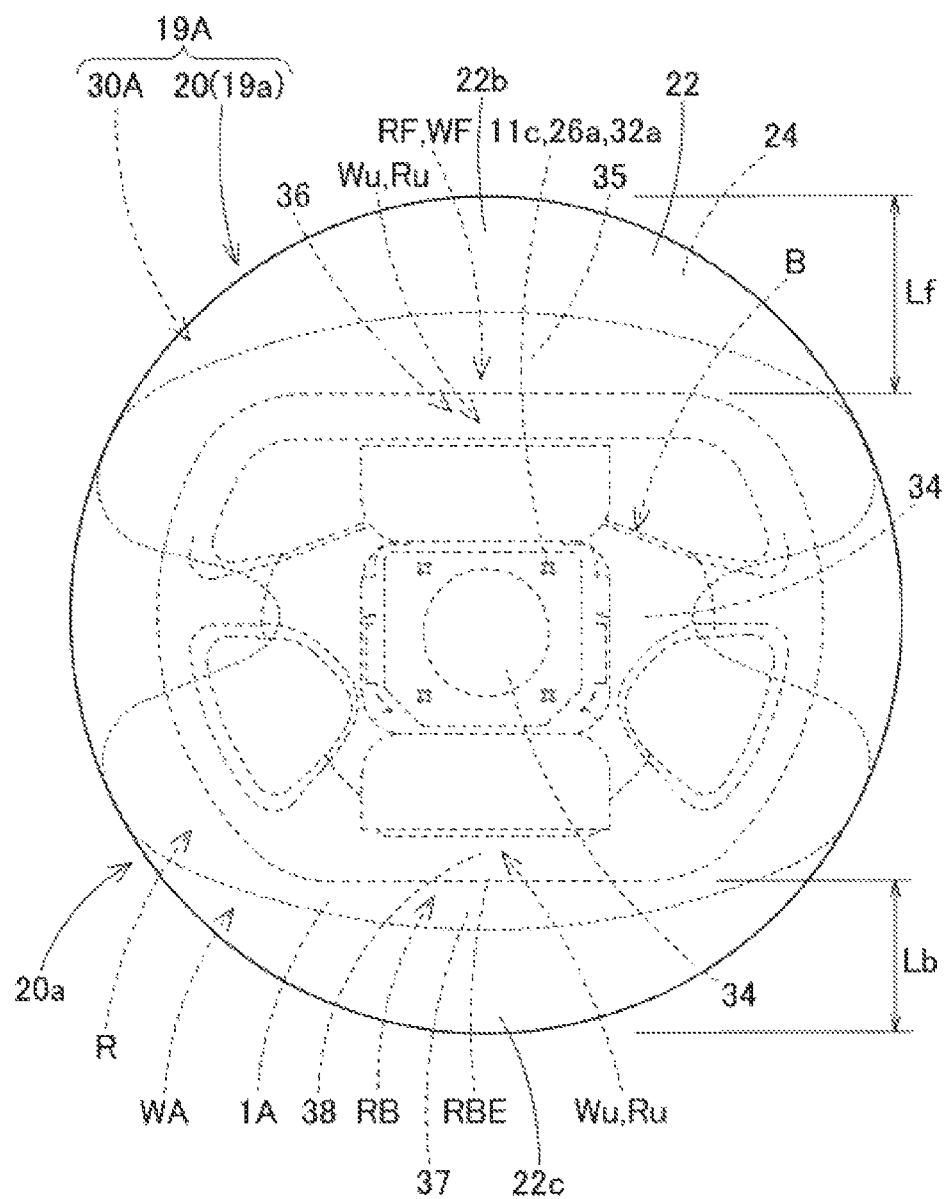
FIG. 9 is a schematic plan view when an operation of the driver airbag apparatus of the second embodiment is completed.
Figure 10:
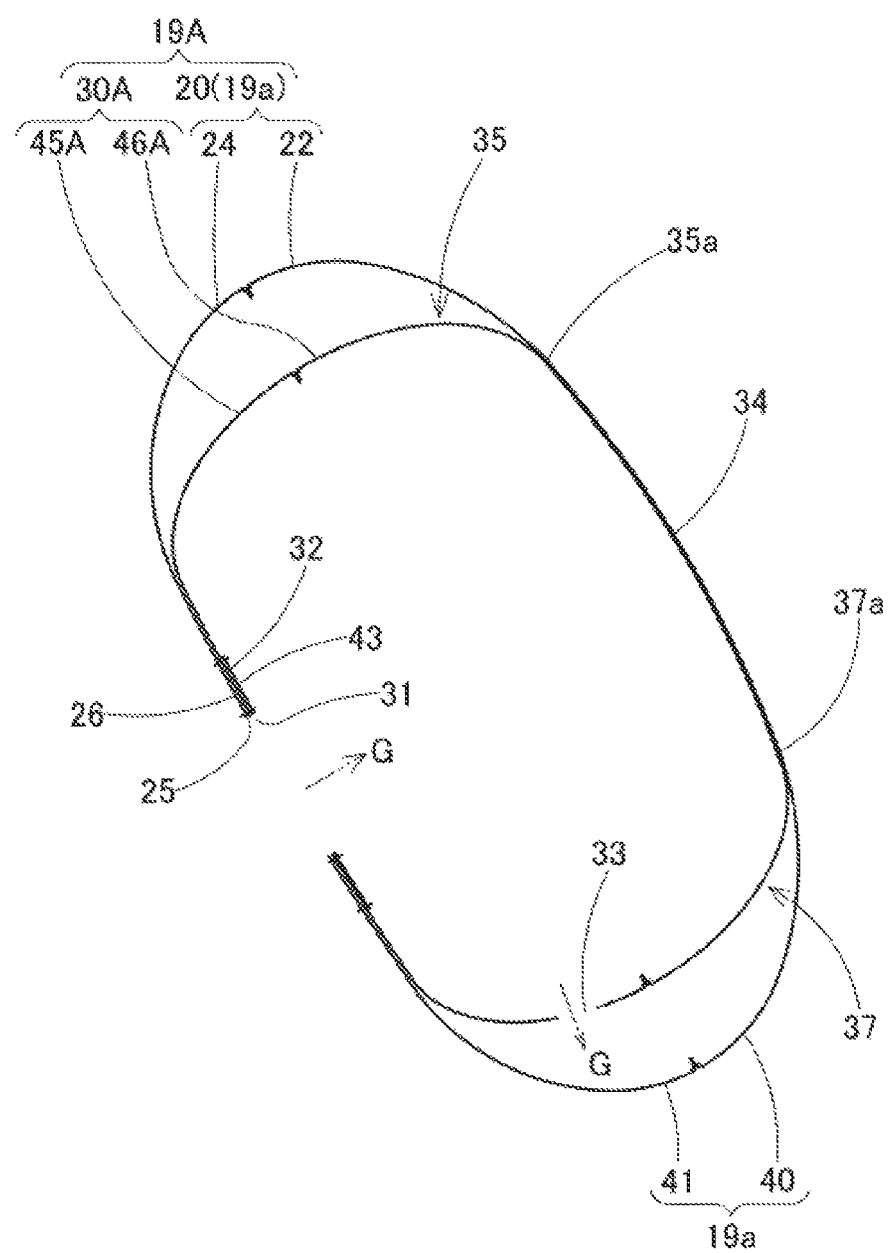
FIG. 10 is a schematic longitudinal cross-sectional view of only the airbag of the second embodiment upon completing inflation.

As shown in FIGS. 7 and 8, an airbag 19A shown in FIGS. 9 and 10 of a second embodiment is used in a driver airbag apparatus MA mounted on a steering wheel main body 1A of a steering wheel WA which has, in terms of a length from the center portion B, lengths YF and YB of both front and rear sides shorter than lengths XL, XR of both left and right sides. The steering wheel WA is shaped such that the rear portion RB side of the ring portion R of the steering wheel W is indented forward and extends along the left-right direction. Further, in addition to the steering wheel WA having a shape in which the rear portion RB side of the ring portion R of the steering wheel W is indented forward, the rest of the configuration is similar to that of the steering wheel W, and the same reference numerals as those in the steering Wheel W will be used for the same portions and members, and descriptions thereof will be omitted.

Further, in the driver airbag apparatus MA, only the airbag 19 is different from the configuration of the airbag 19 of the airbag apparatus M of the first embodiment, the configuration of the inflator 9 and the like of other airbag apparatuses MA is similar to the airbag apparatus M and the same reference numerals as those in the airbag apparatus M will be used for the same portions and members, and descriptions thereof will be omitted.

The airbag 19A of the second embodiment, as shown in FIGS. 9 and 10, is different from the airbag 19 of the first embodiment in the inner member 30A and uses the same outer member 20 as that of the first embodiment. Therefore, in the outer member 20 of the airbag 19A, portions which are the similar to the outer member 20 of the airbag 19 are denoted by the same reference numerals and descriptions thereof will be omitted.

The inner member 30A has a configuration in which, upon completing inflation of the airbag 19A, a rear support inflating portion 37 capable of supporting a rear portion 22c side of the driver side portion 22 of the outer member 20 protrudes from the base portion 34 of the inner member 30 of the airbag 19 of the first embodiment. The rear support inflating portion 37 is configured in a substantially symmetrical shape with the front support inflating portion 35 in the front-rear direction. Therefore, the inner member 30A approximates the inner member 30 and is formed by sewing the outer peripheral edges of the supporting-side base fabric 46A and the opening-side base fabric 45A which has a gourd-shaped outer shape in plan view. The opening-side base fabric 45A is provided with the inflow opening 31 in the center and the mounting portion 32 having the mounting holes 32a in the same manner as the inner member 30 and is formed with the supply ports 33 on the rear of the inflow opening 31.

The airbag 19A is assembled to the airbag apparatus MA in the same manner as the first embodiment and then mounted in the steering wheel WA.

Figure 11A:
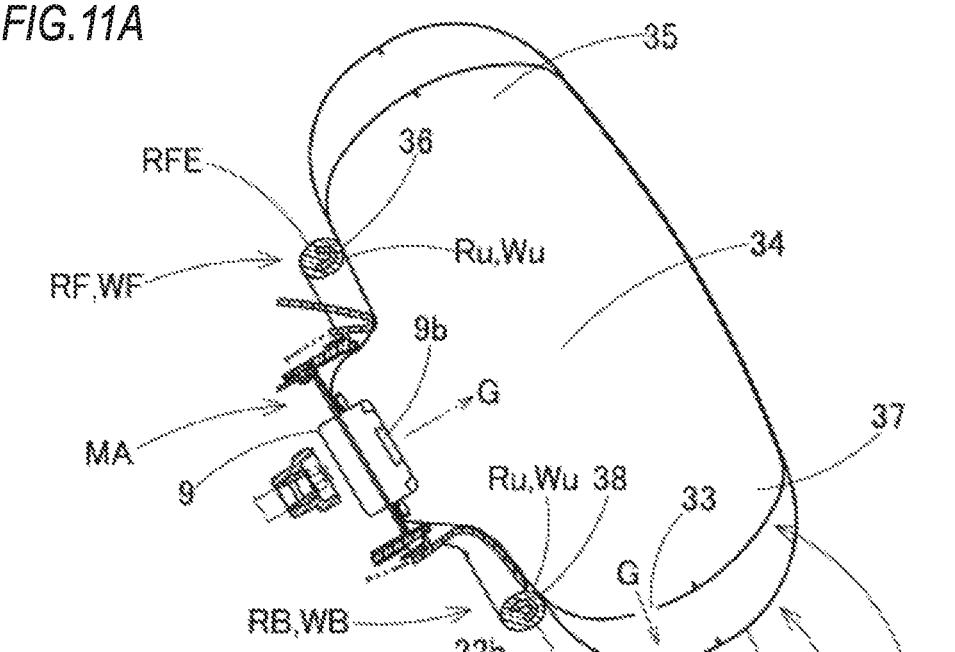
FIGS. 11A and 11B are schematic longitudinal cross-sectional views when a driver is being received during operation of the driver airbag apparatus of the second embodiment.
Figure 11B:
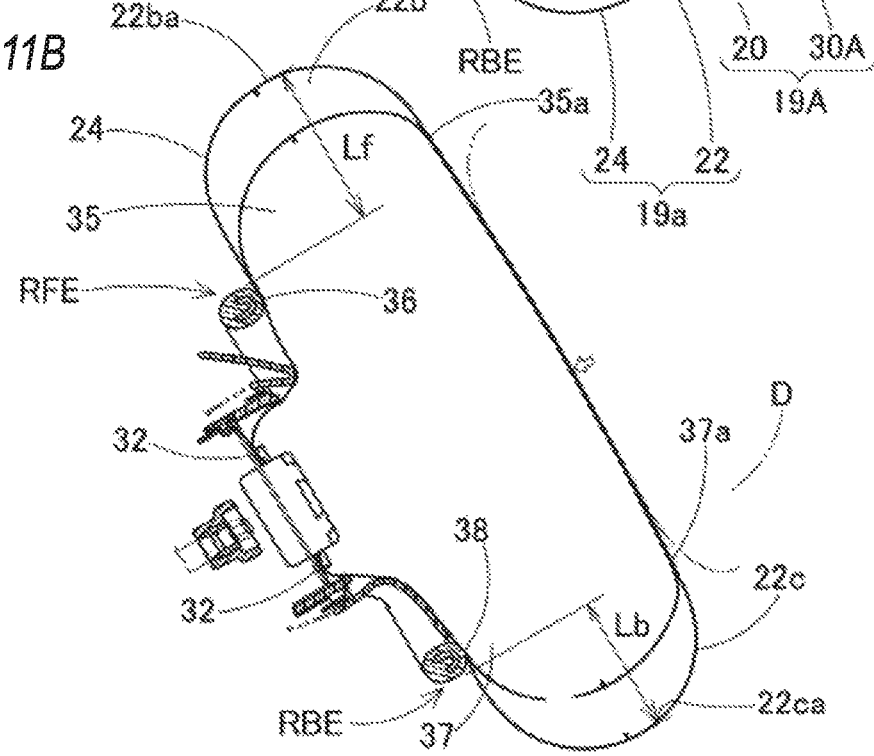

In the driver airbag apparatus MA of the second embodiment, when the inflation gas G is discharged from the gas outlets 9b of the inflator 9 during operation, the inner member 30A expands and the inflation gas G flows from the supply port 33 of the inner member 30A and expands the outer member 20, pushing open the doors 14a of the airbag cover 13 and the airbag 19A, indicated with a two-dot dashed line in FIGS. 7 and 8, and as shown in FIGS. 11A and 11B, protrudes from the case 11 which serves as a storage compartment and covers an upper surface Wu of the steering wheel WA, thereby, completing the inflation process.

Then, as shown in FIGS. 11A and 11B, the inner member 30A is provided so as to maintain a higher pressure than the outer member 20 when the outer member 20 receives the driver. Therefore, the inflated portion of the front support inflating portion 35 and the rear support inflating portion 37 from the base portion 34 where the inflow opening 31 is provided to the rear and front is able to maintain a cushioning property and ensure a high shape retention property. As a result, even if the outer member 20 of the airbag 19 is not directly supported by the front portion WF or rear portion WB of the steering wheel WA, the front support inflating portion 35 can prevent the front portion 22b side of the outer member 20 from sinking, and the rear support inflating portion 37 can prevent the rear portion 22c side of the outer member 20 from sinking, and it is possible to safely receive and protect the driver D approaching the steering wheel WA with the entire airbag 19A including the outer member 20.

That is, as shown in FIG. 9 and FIG. 11B, when the front edge 20ba of the outer member 20 of the airbag 19A is projected forward beyond the front edge RFE of the ring portion R by an amount Lf, and rear edge 20ca of the outer member 20 of the airbag 19A is projected rearward projection beyond the rear edge RBE of the ring portion R by an amount Lb, even if the outer member 20 of the air bag 19 is not supported directly by the steering wheel W at the front WF side and the rear WB side, the front edge of the contact support portion 35a of the front support inflating portion 35 supports the lower surface side of the front portion 22b of the driver side portion 22, or the contact support portion 37a of the rear edge of the rear support inflating portion 37 supports the lower surface side of the rear portion 22c of the driver side portion 22. Therefore, it is possible to prevent the sinking of the front portion 22b side or the rear portion 22c side of the outer member 20, and it is possible to safely receive and protect the driver D approaching the steering wheel WA with the entire airbag 19A including the outer member 20.

Further, also in this airbag 19A, the contact support portion 36 on the lower surface side of the inner member 30A in a range from the front side of the mounting portion 32 to the front support inflating portion 35 at the time of completing inflation and a contact support portion 38 on the lower surface side in a range from the rear side of the mounting portion 32 to the rear support inflating portion 37 are in contact with and supported by a portion of the steering wheel WA side, which in the second embodiment are the upper surface RU on the front edge RFE side and rear edge RBE of the ring portion R via the steering-wheel side portion 24 of the outer member 20.

Therefore, also in the second embodiment, since the front support inflating portion 35 and the rear support inflating portion 37 of the inner member 30A are supported on the steering wheel WA side at two points, i.e. the mounting portion 32 and the contact support portion 36, or the mounting portion 32 and the contact support portion 38, the shape retention property of the inner member 30A, that is, the amount of pressure, is reduced, in other words, since the cushioning action can be further enhanced to support the front portion 22b side and rear portion 22c side of the outer member 20, the airbag 19A can receive and protect the driver D more gently.

Figure 12:
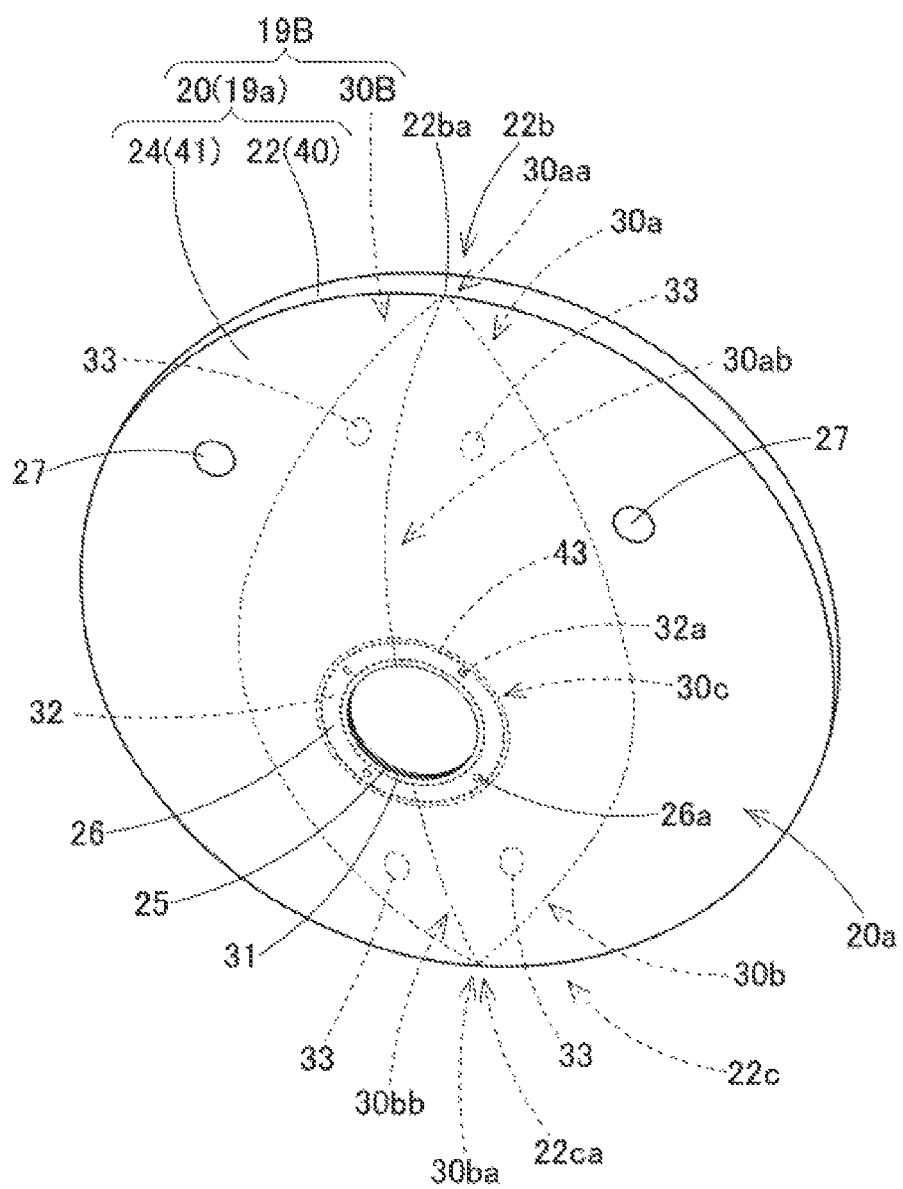
FIG. 12 is a schematic perspective view of only an airbag of a third embodiment of the present invention upon completing inflation.
Figure 13:
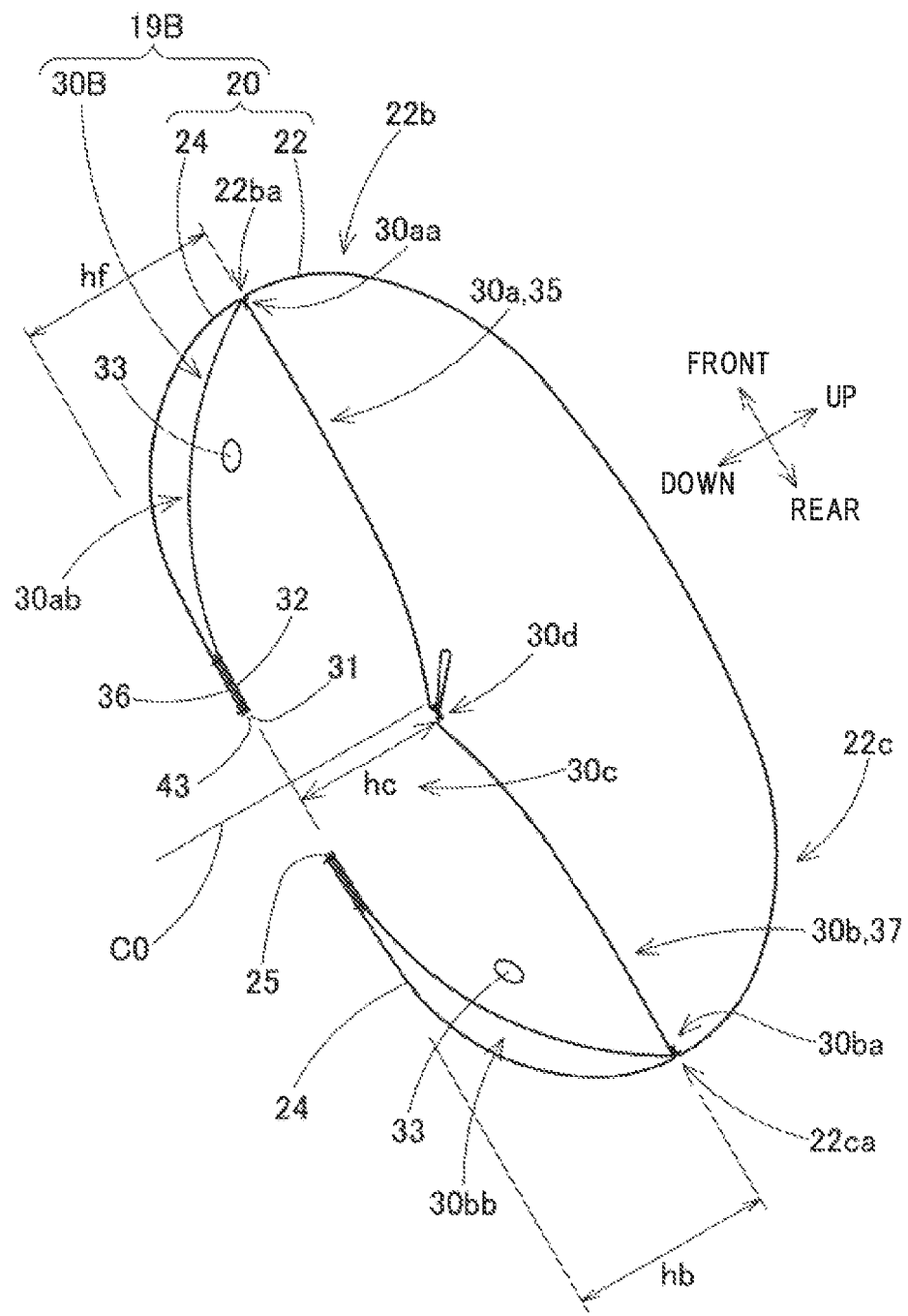
FIG. 13 is a schematic longitudinal cross-sectional view of only the airbag of the third embodiment upon completing inflation.

An airbag 19B of a third embodiment shown in FIGS. 12 and 13 is used in a driver airbag apparatus MB mounted in the steering wheel WA of the second embodiment, as shown in FIGS. 15A to 16C. In the driver airbag apparatus MB, only the airbag 19B is different from the configuration of the airbag 19, 19A of the airbag apparatus M, MA of the first and second embodiments, the configuration of other airbag components, such as the inflator 9, is similar to that of the airbag apparatus M, MA, and the same reference numerals as those in the airbag apparatus M, MA will be used for the same portions and members, and descriptions thereof will be omitted.

The airbag 19B of the third embodiment is different from the airbag 19 of the first embodiment in the inner member 30B and uses the same outer member 20 as that of the first embodiment. Therefore, in the outer member 20 of the airbag 19B, portions which are similar to the outer member 20 of the airbag 19 are denoted by the same reference numerals and descriptions thereof will be omitted.

The inner member 30B, as an inflated shape of the airbag 19B, as shown in FIG. 13, extends to the front and rear from the inflow opening 31 and is provided by connecting the front and rear ends 30aa, 30ba, upon completing inflation, to the front and rear edges 22ba, 22ca of the driver side 22 of the outer member 20. That is, the inner member 30B includes the front support inflating portion 35 of the front end 30aa side which is capable of supporting the front portion 22b of the driver side portion 22 of the outer member 20 and the rear support inflating portion 37 of the rear end 30ba side which is capable of supporting the rear portion 22c of the driver side portion 22 of the outer member 20 upon completing inflation of the airbag 19B.

Moreover, in the inner member 309, as an inflated shape, in terms of a height from the inflow opening 31 in the direction along the axis C0 of the inlet opening 31, heights hf, hb of the front and rear ends 30aa, 30ba are made to be higher than the height hc of a portion 30d which faces the inflow opening 31 provided in the center portion 30c between the front and rear ends 30aa, 30ba. In other words, the inflated shape of the inner member 30B has a front arm portion 30a and a rear arm portion 30b which are tapered toward the front end 30aa and the rear end 30ba from the center portion 30c which is provided with the inlet opening 31, and the front arm portion 30a and the rear arm portion 30b have a shape which is curved upwardly to be higher than the center portion 30c.

Further, the mounting portion 32 having mounting holes 32a are arranged in the peripheral edge of the inlet opening 31 in the center portion 30c of the inner member 30B, and the supply ports 33 which supply inflation gas G to the outer member 20 are formed in the front arm portion 30a and the rear arm portion 30b, respectively.

Moreover, the inner member 30B of the present embodiment has the front end 30aa connected to the front edge 22ba of the driver side 22 of the outer member 20, and the rear end 30ba connected to the rear edge 22ca of the driver side 22 of the outer member 20. More specifically, during the manufacturing of the outer member 20, when the outer peripheral edges of the driver side base fabric 40 and steering-wheel side base fabric 41 are sewn together, the front end 30aa and rear end 30ba of the inner member 30B are also sewn together therein. Moreover, in the inner member 30B, when the airbag 19B is completely inflated, the lower surface 30ab, 30bb side of the front arm portion 30a and rear arm portion 30b are disposed on the steering wheel side portion 24 of the outer member 20 in a detachable manner and are configured such that the front and rear ends 30aa, 30ba are not pulled down without being affected by the peripheral edge portion of the inflow opening 25 of the steering wheel side portion 24 of the outer member 20.

Figure 14:
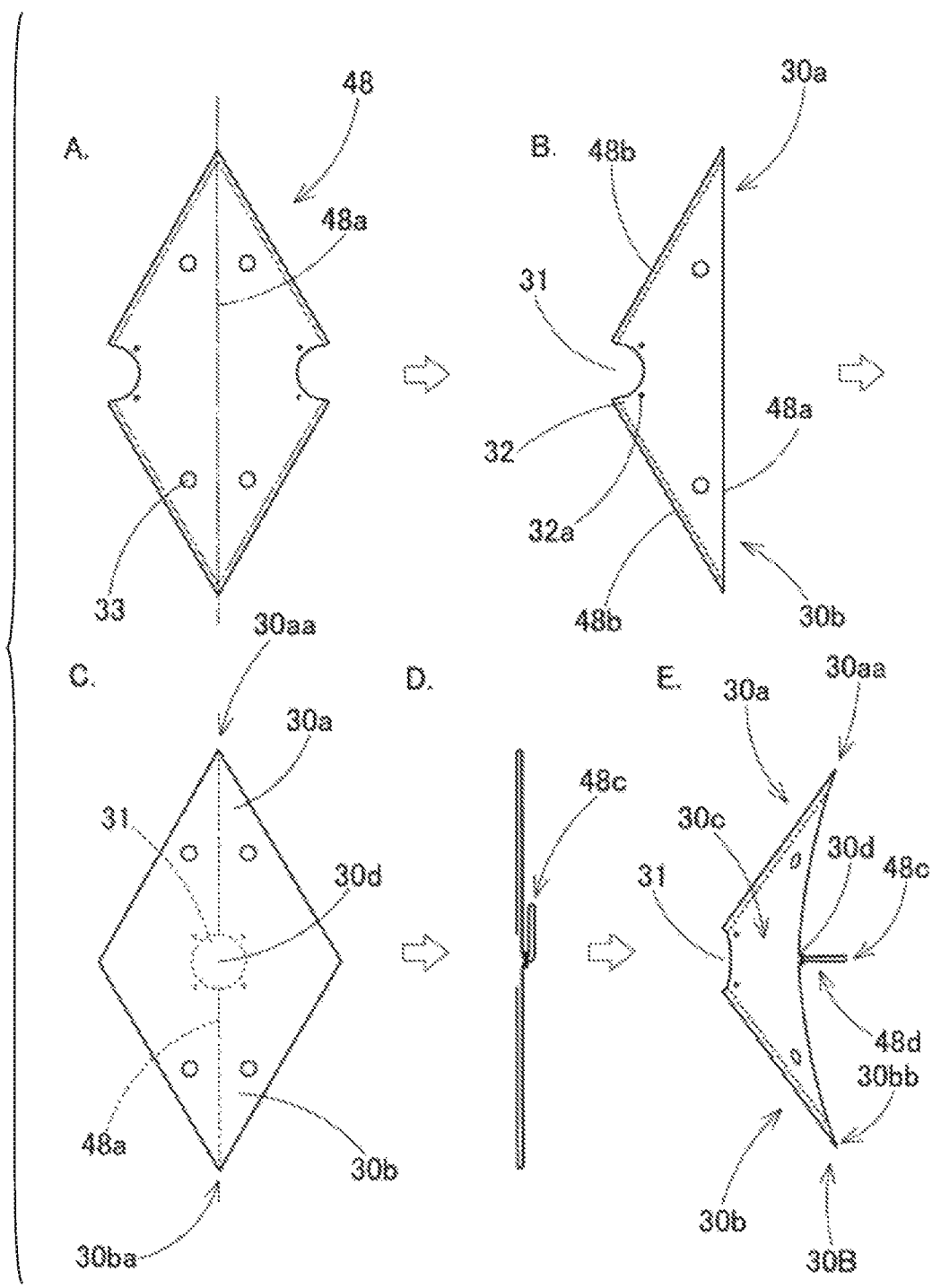
FIG. 14 is a view showing a manufacturing process of an inner part of the third embodiment.

The inner member 30B uses a roughly rhombus-shaped inner member base fabric 48, as shown in A of FIG. 14, which is folded in two at a center line 48a, and then overlapped peripheral edges are sewn along a peripheral edge portion 48b excluding the periphery of the inflow opening 31, as shown in B of FIG. 14. Further, as shown in C of FIG. 14, the crease where the fabric was folded in two is opened, and the facing portion 30d which faces the inflow opening 31 is pulled to form a crease 48c in the direction perpendicular to the center line 48a, and as shown in D of FIG. 14, if the part which was pulled and overlapped 48d is sewn, the inner member 30B shown in E of FIG. 14 can be produced. Incidentally, since the part of the overlapped portion 48d was sewn, the length in the front-rear direction of the center line is shorter than that of the inner member base fabric 48. In other words, as a result of the distance between the front end 30aa and the rear end 30ba along the center line 48a is shortened, the front arm portion 30a and the rear arm portion 30b which extend from the center portion 30c become curved toward the upper side and the inner member 30B can thus be manufactured.

As described above, during the manufacturing of the outer member 20, when the outer peripheral edges of the driver side base fabric 40 and steering-wheel side base fabric 41 are sewn together, the front end 30aa and rear end 30ba of the inner member 30B are also sewn together therein, and by turning everything inside-out through the flow opening 25, the airbag 19B can be manufactured. The airbag 19B can be assembled to the airbag apparatus MB in an operation similar to that of the first embodiment and can be mounted in the steering wheel WA.

In the airbag 19B of the third embodiment, once the airbag apparatus MB operates, the inflation gas G is discharged from the gas outlets 9b of the inflator 9, so that the inner member 30B expands. Then, the outer member 20 is inflated by the inflation gas G flowing though the supply port 33, and when the inflation of the outer member 20 is completed, the inner member 30B has shape retention property and completes inflation with high pressure. In this state, the front end 30aa in the vicinity of the front arm portion 30a, which serves as the front support inflating portion 35, and the rear end 30ba in the vicinity of the rear arm portion 30b, which serves as the rear support inflating portion 37 are disposed so as to support the front portion 22b and rear portion 22c of the driver side portion 22 of the outer member 20. Therefore, according to the airbag 19B of the third embodiment, even if the airbag 19B is not directly supported by the front portion WF side and rear portion WB side of the steering wheel WA, the front support inflating portion 35 of the inner member 30B can prevent the front portion 22b of the outer member 20 from sinking, and the rear support inflating portion 37 can prevent the rear portion 22c side of the outer member 20 from sinking, and it is possible to safely receive and protect the driver D approaching the steering wheel WA with the entire airbag 19B including the outer member 20.

Figure 15A:
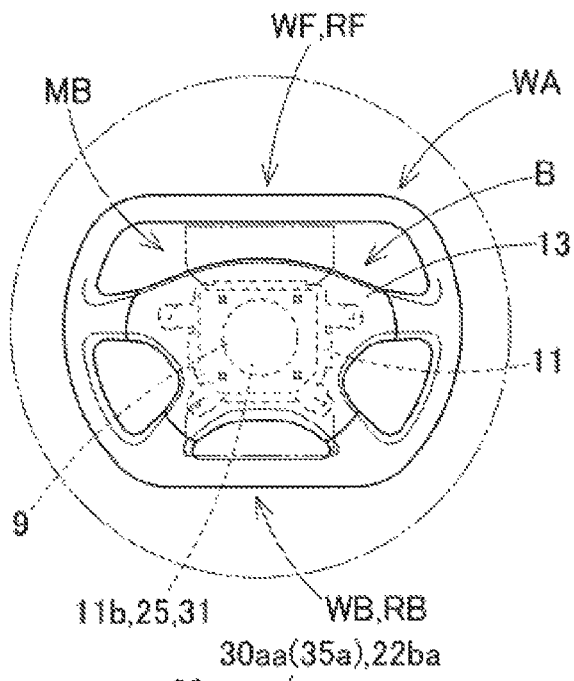
FIGS. 15A and 15B are schematic plan views of the driver airbag apparatus of the third embodiment before operation and upon completing operation.
Figure 15B:
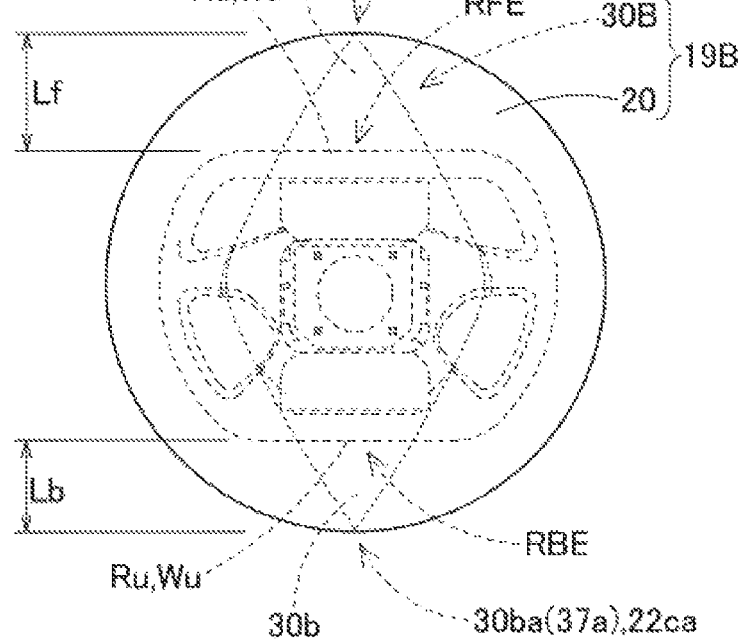

That is, as shown in FIG. 15B, when the front edge 20ba of the outer member 20 of the airbag 19B is projected forward beyond the front edge RFE of the ring portion R by an amount Lf, and the rear edge 20ca of the outer member 20 of the airbag 19B is projected rearward beyond the rear edge RBE of the ring portion R by an amount Lb, even if the outer member 20 of the airbag 19B is not supported directly by the steering wheel W at the front WF side and the rear WB side, the front and rear support inflating portions 35 and 37 of the inner member 30B expands so as to maintain a state in which the position of each end 30aa, 30ba is above the center portion 30c of the inner member 30B, that is, the inner member 30B expands so as to maintain the curved shape where both the front end 30aa and rear end 30ba are curved upward from the enter portion 30c. Therefore, the contact support portion 35a (front end 30aa) at the front edge of the front support inflating portion 35 supports the front edge 22ba of the front portion 22b side of the driver side portion 22, or the contact support portion 37a (rear end 30ba) at the rear edge of the rear support inflating portion 37 supports the rear edge 22ca of the rear portion 22c side of the driver side portion 22, so as to prevent the sinking of the front portion 22b side or the rear portion 22c side of the outer member 20. Accordingly, it is possible to safely receive and protect the driver D approaching the steering Wheel WA with the entire airbag 19B including the outer member 20.

Further, in the airbag 19B of the third embodiment, the inner member 30B extends to the front and rear from the inflow opening 31 or the center portion 30c which is provided with the mounting portion 32 and expands so as to maintain the curved shape formed by being curved upward (tilting upward to the front and rear) in both the front arm portion 30a and rear arm portion 30b having the front support inflating portion 35 and the rear support inflating portion 37. Therefore, in this airbag 19B, as shown in FIGS. 16A and 16B, in the case where the abdomen DB of the driver D approaches the rear portion WB side of the steering wheel WA, if the inner member 20B of the airbag has completed inflation, the rear support inflating portion 37 receives the abdomen DB of the driver D via the driver side portion 22 of the outer member 20. Then, the rear support inflating portion 37 is pushed by the abdomen DB of the driver D, and the inner member 30B swings with the vicinity of the mounting portion 32 mounted to the center portion B of the steering wheel WA as the center, and the front support inflating portion 35 approaches the driver D, particularly the vicinity of the driver's head DH. Therefore, as shown in FIG. 16C, the front support inflating portion 35 of the inner member 30B can quickly receive the head DH areas of the driver D via the outer member 20.

Conversely, as shown in FIGS. 17A and 17B, if the vicinity of the driver's head DH is received first by the front support inflating portion 35 of the inner member 30B, the inner member 30B swings and the rear support inflating portion 37 approaches the vicinity of the abdomen DB of the driver D to quickly receive and protect the vicinity of the driver's abdomen DB via the outer member 20.

Naturally, the front support inflating portion 35 and the rear support inflating portion 37 of the inner member 30B can receive the head area DH and abdomen area DB of the driver D roughly at the same time via the outer member.

Therefore, with the airbag 19B of the third embodiment, even if the outer member 20 of the airbag 19B is not directly supported by the front portion WF side or rear portion WB side of the steering wheel WA, the front support inflating portion 35 and the rear support inflating portion 37 can prevent the front portion 22b side and the rear portion 22c side of the outer member 20 from sinking, and it is possible to safely receive and protect the driver D approaching the steering wheel WA with the entire airbag 19B including the outer member 20.

Further, also in this airbag 19B of the third embodiment, in the inner member 30B at the time of completing inflation, the contact support portion 36 on the lower surface side in a range from the front side of the mounting portion 32 to the front support inflating portion 35 and the contact support portion 38 on the lower surface side in a range from the rear of the mounting portion 32 to the rear inflating supporting portion 37 are in contact with and supported by a portion of the steering wheel WA side, which in the third embodiment is a portion of the peripheral edges of the opened doors 14a of the center portion B via the steering-wheel side portion 24 of the outer member 20.

Therefore, also in the third embodiment, since the front support inflating portion 35 and the rear support inflating portion 37 of the inner member 30B are in a state of being supported on the steering wheel WA side at two points, i.e. the mounting portion 32 and the contact support portion 36, or the mounting portion 32 and the contact support portion 38, the shape retention property of the inner member 30B, that is, the amount of pressure, can be reduced, in other words, since the cushioning action can be further enhanced to support the front portion 22b side and rear portion 22c side of the outer member 20, the airbag 19B can receive and protect the driver D more gently.

In the meantime, the supply ports 33 which supply inflation gas to the outer member 20 provided to the inner member 30, 30A, 30B may have a check valve structure such that the high-pressure state of the inner member 30, 30A, 30B can be further maintained. For example, the supply port may be configured as a hose-shaped portion having the flexibility to extend cylindrically toward the outer member 20, so that when inflation gas is supplied from the inner member side to the outer member side, a hose shape is maintained, and when inflation gas flow reversely, the hose-shaped portion may fold over so as to reverse its peripheral wall to the inner member so that the supply port is blocked, thereby configure check valve structure.

What is claimed is:

1. An airbag which is configured to be accommodated and retained in a center portion of a steering wheel of a vehicle and includes an outer peripheral wall, upon completing inflation of the airbag, the outer peripheral wall including a driver side portion configured to receive a driver, and a steering-wheel side portion supported by the steering wheel and having an outer peripheral edge connected to an outer peripheral edge of the driver side portion, wherein an inflow opening is provided in a vicinity of a center of the steering-wheel side portion and configured to allow inflation gas to flow, and a mounting portion is provided on a peripheral edge of the inflow opening and configured to be fixed to the center portion of the steering wheel, the airbag comprising:

an outer member configured to form the outer peripheral wall upon completing inflation; and an inner member provided so as to expand inside the outer member, wherein the inner member and the outer member include the inflow opening and the mounting portion, the inner member has a supply port for supplying inflation gas to the outer member and covers the inflow opening of the outer member so as to be arranged on an upstream side of flow of the inflation gas which is flowing from the inflow opening into the airbag such that a higher pressure can be maintained in the inner member than the outer member when the outer member receives a driver, the inner member includes a front support inflating portion configured to support a portion of the driver side portion of the outer member at least at a front side in a front-rear direction upon completing inflation of the airbag, the inner member further includes a rear support inflating portion configured to support a portion of the driver side portion of the outer member at a rear side in the front-rear direction upon completing inflation of the airbag, upon completing inflation, the inner member has a shape which extends front and rear of the inflow opening, upon completing inflation, front and rear ends of the inner member are provided in a vicinity of front and rear edges of the driver side portion of the outer member, respectively, and in terms of a height from the inflow opening in a direction along an axis of the inflow opening, the heights of the front and rear end portions of the inner member are higher than a height of a portion of the inner member facing the inflow opening at a center portion between the front and rear ends thereof.

2. The airbag according to claim 1, wherein upon completing inflation, a contact support portion which is configured to be in contact with and supported by a portion of the steering-wheel side portion is arranged on a lower side of the inner member in a range from a front side of the mounting portion to the front support inflating portion via the outer member.

* * * * *